United States Patent [19]

De Christopher

[11] Patent Number: 4,464,405
[45] Date of Patent: Aug. 7, 1984

[54] METHOD FOR MAKING PIZZA SHELLS

[76] Inventor: Eugene L. De Christopher, P.O. Box 1066, Belvedere, Calif. 94920

[21] Appl. No.: 381,457

[22] Filed: May 24, 1982

[51] Int. Cl.³ .......................... A21D 8/02; A21D 8/06
[52] U.S. Cl. .................................. 426/391; 425/395; 426/496; 426/512
[58] Field of Search .................... 249/121, 122, 135; 425/395; 99/426, 428, 430, 431, 432, 433, 439, 353, DIG. 15, 644, 444, 450; 426/94, 138, 283, 280, 279, 391, 502, 496, 498, 512

[56] References Cited

U.S. PATENT DOCUMENTS

| | | | |
|---|---|---|---|
| 284,295 | 9/1883 | Hailes | 99/444 |
| 366,679 | 7/1887 | North | 99/444 |
| 366,960 | 7/1887 | Johnson et al. | 99/444 |
| 2,534,407 | 12/1950 | Bramberry | 99/444 |
| 3,854,023 | 12/1974 | Levinson | 99/426 |
| 3,879,564 | 4/1975 | Cocozella | 426/283 |
| 3,958,504 | 5/1976 | Levin | 99/426 |
| 4,046,920 | 9/1977 | Moline | 426/502 |
| 4,265,919 | 5/1981 | Munter et al. | 426/502 |
| 4,303,677 | 12/1981 | De Acetis | 426/283 |
| 4,364,963 | 12/1982 | Munter et al. | 426/283 |

*Primary Examiner*—Willard E. Hoag
*Attorney, Agent, or Firm*—Melvin R. Stidham

[57] ABSTRACT

A method for making pre-baked pizza shells and the like, commercially, in which each pizza is individually formed as distinguished from the usual practice in which sheeters and die cutting ring rollers are employed.

A charge of dough from a rounder is deposited on a reusable cast mold in which the dough is proofed prior to baking. A reusable lid is applied to the mold to provide a support when the assembly is inverted, the mold reversed, and the product baked on the lid.

6 Claims, 6 Drawing Figures

METHOD FOR MAKING PIZZA SHELLS

This invention relates to the manufacture of pre-baked pizza shells and the like bakery products and especially to the commercial manufacture of such products. Heretofore the common practice in making pizza shells commerically has been to pass the mixed dough from the mixer blender or extruder to a dough divider, rounder, proofer equipment then to a conveyor and into an oven. The dough is supported as a wide sheet and die cutting rollers are then employed to cut circular disks from the sheet with the excess dough being returned to the blender or hopper. The said disks of dough are then baked on a conveyor passing through an oven.

One of the disadvantages of the above noted method of commerical operation is that the baked pizza shells are all uniform in shape and appearance and therefore not as appetizing as hand made pre-baked pizza shells.

Another disadvantage of presently availabe pizza making equipment is that very expensive equipment such as extruders, sheeters and die cutters are required thereby greatly increasing the cost involved.

The main object of the present invention is to improve the quality and consumer appeal of pre-baked pizza shells and at the same time reduce the cost.

Another object is the provision of a method and apparatus which gives the finished pizza shell the appearance of being hand made.

Other objects and advantages will be apparent from the following specification and drawings.

Figure 1:
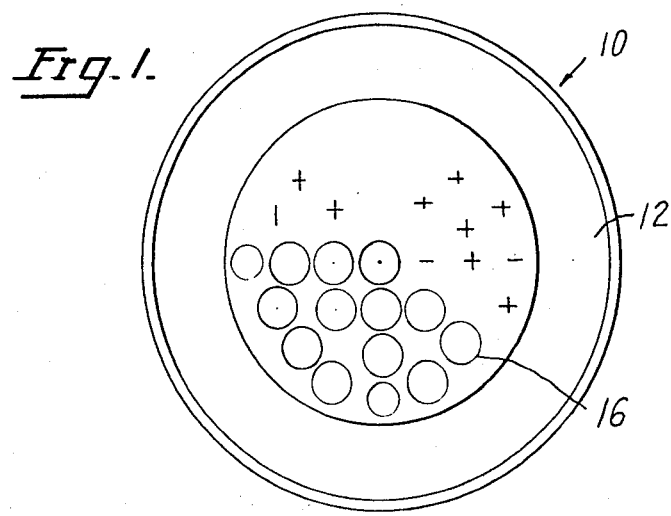
FIG. 1 is a top plan view of the cast mold used in carrying out the method of the invention.
Figure 2:
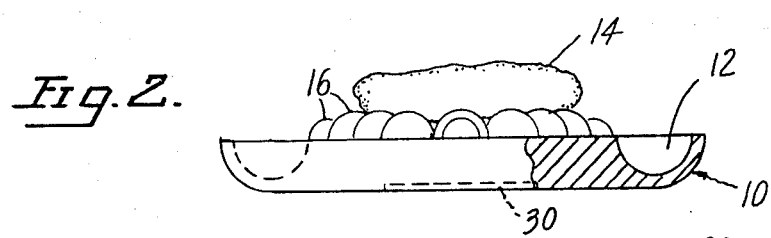
FIG. 2 is a side elevation, partly in section, of the mold of FIG. 1 showing a charge of dough thereon.

In detail, and first with reference to FIGS. 1, 2, a generally circular shaped cast mold is indicated at 10 although it will be understood that molds of different shapes may be provided if desired.

Figure 6:
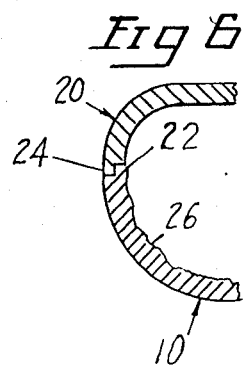
FIG. 6 is a fragmentary section through the periphery of the mold and lid of FIG. 4 showing the interengaging elements.

The mold 10 is preferably formed by casting aluminum or steel and employing a hand made pizza to provide the particular cast shape or maquette. Thus, although the casting and lid are shown in FIGS. 1-5 as of regular shape to simplify the drawings it is preferable to make the inner walls of the casting and lid an irregular surface as shown in FIG. 6 to simulate the appearance of a hand made product.

As best seen in FIG. 1 the cast mold 10 is formed to provide a peripherally extending upwardly opening channel indicated at 12 which will subsequently define a peripheral crust in the finished pizza thus enhancing the hand made appearance of the product.

From a conventional rounder a charge 14 of mixed and blended dough is applied centrally to the cast mold 10 as seen in FIG. 2. The central portion of the cast mold 10 is formed with a plurality of upwardly directed protuberances or fingers 16 which cause the plastic like dough to be indented at spaced points resulting in the trapped gases within the dough being forced radially outwardly toward the periphery of the dough mass. This contributes to the lightness of the finished product and especially the peripheral crust.

Figure 3:
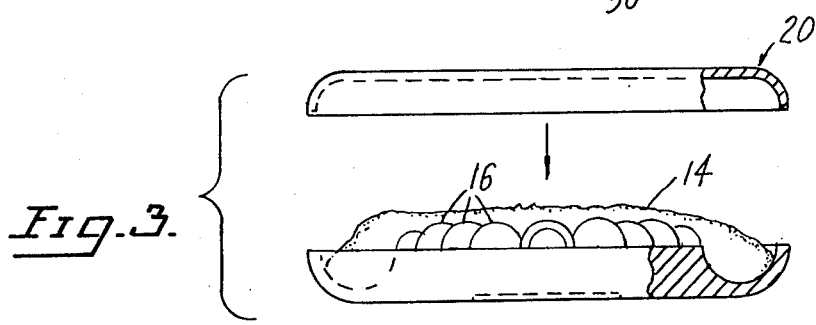
FIG. 3 is an exploded view of the mold and its lid, partly in section and in vertically spaced relationship.

At this point time may be allowed for proofing during which the dough may spread outwardly to take a shape somewhat similar to that shown in FIG. 3.

Figure 4:
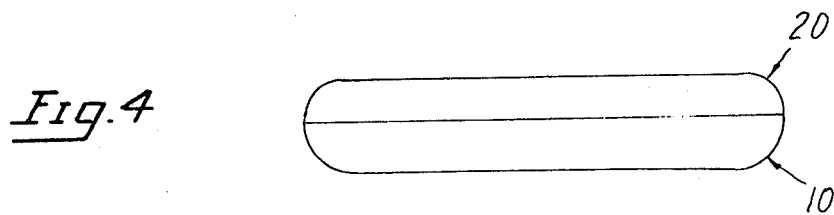
FIG. 4 is a side elevation of the mold and lid assembled.

The next step is to apply a lid generally designated 20 on top of the dough so that, as the dough conforms to the shape of the interior of the mold and lid assembly, the mold and lid become interfitted together as seen in FIG. 4. To this end the free ends of the peripheral lips of the mold and lid are formed as best seen in FIG. 6 wherein the mold is formed with an inner upwardly projecting lip 22 and the lid 20 is formed with a downwardly extending outer lip 24. As noted above in connection with FIG. 6 the inner surface 26 is preferably rough and conforming to the hand made shape of the original pizza.

At this point the assembly may be flash frozen so that the pizza dough 14 retains the desired irregular shape.

Figure 5:
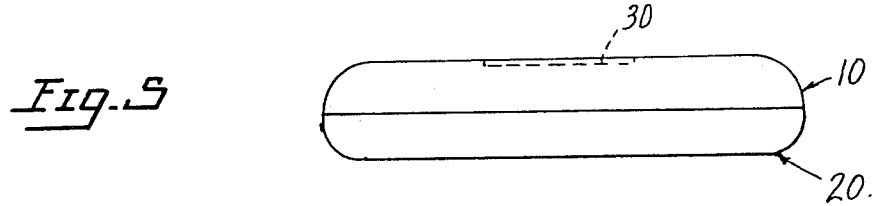
FIG. 5 is a side elevation of the assembly of FIG. 4 inverted.

After the dough has been made firm by the cold temperature and the assembly removed from the freezing atmosphere the assembly is inverted to the orientation of FIG. 5.

At this point the mold is removed. If said mold is of steel it may be removed by a magnetic lug apparatus that is well known in the art. However if the mold is of nonmagnetizable material it may be formed with an integral central steel plate 30 to permit magnetic removal.

By the above steps the dough is supported on the lid 20 which now becomes a baking tray. Said lid may be made of wood fiber pulp paper processed in such a way that it can be exposed to normal oven temperatures of 350° F. to 700° F. without damage.

As a final step each pizza shell maybe packaged in a package similar to that shown in my copending application Ser. No. 352,359 filed Feb. 25, 1982.

Although no claim is made herein to the dough or its ingredients, it has been found that the addition of yeast is preferable to the use of dough without yeast as is the present commercial practice. Because of limitations in the presently available equipment it has not been possible to take advantage of the good qualities of yeast which give the product a desirable lightness, puffiness, and taste appeal.

It should be noted that the assembly of the cast mold 10 and the lid 20 acts as a proofer and former at the same time. Furthermore, the fingers or protuberances 16 cause the gases in the dough to be forced outwardly to give the peripheral crust the desired lightness. In a mass production commerical installation the fingers 16 may be actuated by a cam means to force them into the dough in a random fashion in like manner as the fingers of a baker. For the same reason the fingers 16 may be of different diameters and length to give the uneven finished surface which characterizes a hand made pizza shell. The actual finished surface of the central portion of the pizza shell should be in the order of about $\frac{1}{8}''$ thick to give the desired lightness to the product.

It should also be noted that the assembly of mold 12 and lid 20 provides a means for holding the humidity of the dough at a high enough level to prevent the outer surfaces of the dough from becoming dried out and tough during proofing.

I claim:

1. In the method of making a shell or like product of bread dough, the steps of:

providing a mold with a plurality of upwardly projecting protuberances and a groove around the edges thereof;

applying a thick mass of dough on top of said mold; and proofing said dough within said mold for a period of time to enable said dough to expand into said groove and to occupy spaces between said protuberances.

2. The method defined by claim 1 wherein:

the surface of said mold apart from said protuberances is provided with irregularities to apply a roughened texture to dough coming in contact therewith.

3. The method defined by claim 1 including the further step of:

applying a lid to said mold to limit outward expansion of said dough.

4. The method defined by claim 3 including the further step of:

flash freezing said dough to retain the shape thereof.

5. The method defined by claim 4 including the further step of:

inverting said mold, dough and lid as a unit; and thereafter removing said mold so that said frozen dough is supported on said lid with indentations in the now upper surface thereof created by said protuberances.

6. The method defined by claim 5 including the further step of:

placing said lid and dough in a heated oven.

* * * * *